US008243074B1

(12) United States Patent
Kilat et al.

(10) Patent No.: US 8,243,074 B1
(45) Date of Patent: Aug. 14, 2012

(54) METHOD AND SYSTEM FOR PROVIDING A PERSONALIZED AND DYNAMIC FINANCIAL CARICATURE GRAPHIC

(75) Inventors: Kyle Kilat, Mountain View, CA (US); Jose Alvarez, Sunnyvale, CA (US); Joseph W. Lasee, Mountain View, CA (US); Brian H. Vatcher, Cathedral City, CA (US)

(73) Assignee: Intuit Inc., Mountain View, CA (US)

( * ) Notice: Subject to any disclaimer, the term of this patent is extended or adjusted under 35 U.S.C. 154(b) by 827 days.

(21) Appl. No.: 12/270,181

(22) Filed: Nov. 13, 2008

(51) Int. Cl.
*G06T 11/20* (2006.01)
*G07B 17/00* (2006.01)
*G06Q 40/00* (2012.01)
(52) U.S. Cl. .............................. 345/440; 705/30; 705/35
(58) Field of Classification Search ........................ None
See application file for complete search history.

(56) References Cited

U.S. PATENT DOCUMENTS

| | | | |
|---|---|---|---|
| 7,050,997 B1 * | 5/2006 | Wood, Jr. ..................... | 705/36 R |
| 7,603,621 B2 * | 10/2009 | Toyama et al. ............... | 715/707 |
| 7,783,552 B2 * | 8/2010 | Assia et al. .................. | 705/36 R |
| 2006/0122916 A1 * | 6/2006 | Kassan ........................... | 705/27 |
| 2006/0129468 A1 * | 6/2006 | Lovesy et al. ................. | 705/35 |
| 2007/0150368 A1 * | 6/2007 | Arora et al. ..................... | 705/26 |
| 2010/0063914 A1 * | 3/2010 | Lozano et al. ................. | 705/35 |

OTHER PUBLICATIONS

World of Warcraft Manual, 2004, Blizzard Entertainment.*

* cited by examiner

*Primary Examiner* — Kee M Tung
*Assistant Examiner* — Zhengxi Liu
(74) *Attorney, Agent, or Firm* — McKay and Hodgson, LLP; Philip McKay; Sean P. Lewis

(57) ABSTRACT

A dynamic financial caricature graphic whereby financial data associated with a user is obtained from one or more sources. The financial data associated with a user obtained from one or more sources is then aggregated and/or categorized/re-categorized to generate a personalized financial caricature graphic that is a visual representation of the user and the user's financial situation. The visual characteristics of the dynamic financial caricature graphic, such as size, weight, height, clothing, color, accessories, etc., are chosen based on the financial data associated with a user obtained from one or more sources and/or one or more criteria provided. The user's financial data is then monitored and the visual characteristics of the dynamic financial caricature graphic are changed and/or updated in accordance with changes in the financial data associated with the user obtained from the one or more sources.

20 Claims, 6 Drawing Sheets

METHOD AND SYSTEM FOR PROVIDING A PERSONALIZED AND DYNAMIC FINANCIAL CARICATURE GRAPHIC

BACKGROUND

Currently, many individuals, households, and businesses utilize computing system implemented financial management systems to manage their finances and to provide insight into their financial habits and/or status. Currently, various computing system implemented financial management systems are available including: computing system implemented personal and small business financial management systems; online banking systems; computing system implemented tax preparation systems; computing system implemented business accounting systems; and computing system implemented medical expense management systems; as well as various other electronic transaction and spending data driven, online or desktop financial management systems.

Computing system implemented financial management systems typically help users manage their finances by providing a centralized interface with banks, credit card companies, and other various financial institutions, for identifying and categorizing user financial transactions. Currently, computing system implemented financial management systems typically obtain financial transaction information, such as payee, payment amount, date, etc. via communication with banks, credit card providers, or other financial institutions, using electronic data transfer systems such as the Open Financial Exchange (OFX) specification, or various other systems for transferring financial transaction data.

As noted above, using computing system implemented financial management systems, the financial transaction information, such as payee, payment amount, date, etc. is used by the computing system implemented financial management system to categorize individual financial transactions as a particular type of income or expense. Some currently offered computing system implemented financial management systems then use this financial transaction information to track events, such as purchase events, and to provide various financial data reports or displays including "to date" historical data reports such as historical spending data reports in particular categories and during defined timeframes.

Financial data reports produced by currently available computing system implemented financial management systems are largely automatically produced by the computing system implemented financial management systems, typically in response to general and/or specific data report parameters entered by the user, or another party. Often these financial data reports are presented in formats that typically present large amounts of data as text, or in other information intensive, but largely visually unappealing, forms. In addition, the amount of information presented in many financial data reports produced by currently available computing system implemented financial management systems often confuses the user and obscures the importance of the various data presented, with static, and often unnecessary details.

Experience has shown that, in contrast to the information displays of currently available computing system implemented financial management systems, an average user is far more likely to adopt, and continue to use, a computing system implemented financial management system, if that computing system implemented data management system provides both an intuitive display of information and a visually interesting or entertaining display of the information. While, as noted above, computing system implemented financial management systems have enjoyed a tremendous increase in popularity, current computing system implemented financial management systems typically fail to provide this visually interesting or entertaining display of the financial information element.

SUMMARY

In accordance with one embodiment, a system and method for providing a dynamic financial caricature graphic includes a process for providing a dynamic financial caricature graphic whereby financial data associated with a user is obtained from one or more sources. In one embodiment, the financial data associated with a user obtained from one or more sources includes, but is not limited to, data associated with specific financial transactions, financial transaction categories, and/or transaction timeframes, and/or payees. In one embodiment, the financial data associated with a user obtained from one or more sources is first categorized by a computing system implemented financial management system and/or the user. In one embodiment, the financial data associated with a user obtained from one or more sources is then aggregated and/or categorized/re-categorized by the process for providing a dynamic financial caricature graphic to generate a dynamic financial caricature graphic that is a visual representation of the user and includes visual features/characteristics indicating attributes associated with the user's financial situation. In one embodiment, the visual features/characteristics of the dynamic financial caricature graphic, such as size, weight, height, clothing, color, accessories, etc., are chosen by the process for providing a dynamic financial caricature graphic based on the financial data associated with a user obtained from one or more sources and/or one or more criteria provided by the process for providing a dynamic financial caricature graphic and/or the user. In one embodiment, the user's financial data is then monitored and the visual characteristics of the dynamic financial caricature graphic are changed and/or updated in accordance with changes in the financial data associated with the user obtained from the one or more sources.

In accordance with one embodiment, the financial data associated with a user includes, but is not limited to, any of the following: data representing any activity in one or more of various financial accounts; data representing specific financial transactions; data representing financial transactions in specific financial transaction categories; data representing financial transactions in specified timeframes; data representing financial transactions involving specific payees; data representing overall spending in specific categories and/or timeframes; and/or any other financial data associated with the user as designated by the user and/or the process for providing a dynamic financial caricature graphic.

In accordance with one embodiment, the financial data associated with a user is provided to, or otherwise obtained by, the process for providing a dynamic financial caricature graphic from a computing system implemented financial management system, as defined herein, implementing, or used in conjunction with, and/or otherwise accessible by, the process for providing a dynamic financial caricature graphic. In one embodiment, the financial data associated with a user is provided to, and/or entered into, and/or transferred to, and/or downloaded to, and/or otherwise obtained by, the process for providing a dynamic financial caricature graphic and/or a computing system implemented financial management system by any means, method, or mechanism, for providing and/or obtaining and/or transferring and/or downloading data, as discussed herein, and/or known at the time of filing, and/or as developed thereafter.

In one embodiment, the financial data associated with a user is provided to, and/or entered into, and/or transferred to, and/or downloaded to, and/or otherwise obtained by, the process for providing a dynamic financial caricature graphic and/or a computing system implemented financial management system from the user, a bank, credit card company, a credit reporting agency or bureau, and/or any other financial institution or data source via any network or network system, as discussed herein, and/or available or known at the time of filing, and/or as later developed.

In one embodiment, the financial data associated with a user is provided to, and/or entered into, and/or transferred to, and/or downloaded to, and/or otherwise obtained by, the process for providing a dynamic financial caricature graphic, and/or a computing system implemented financial management system, from the user, a bank, credit card company, a credit reporting agency or bureau, and/or any other financial institution or data source through a user interface device, such as a keyboard, mouse, touchpad, voice recognition software, or any other device and/or system capable of providing user input to a computing system and/or for translating user actions into computing system operations, whether available or known at the time of filing or as developed later.

In one embodiment, the financial data associated with a user is provided to, and/or entered into, and/or transferred to, and/or downloaded to, and/or otherwise obtained by, the process for providing a dynamic financial caricature graphic, and/or a computing system implemented financial management system, from a database maintained by the user, a bank, a credit card company, credit reporting agency or bureau, and/or any other financial institution or data source, as discussed herein, and/or available or known at the time of filing, and/or as later developed.

In one embodiment, the financial data associated with a user is provided to, and/or entered into, and/or transferred to, and/or downloaded to, and/or otherwise obtained by, the process for providing a dynamic financial caricature graphic, and/or a computing system implemented financial management system, from the user, a bank, credit card company, a credit reporting agency or bureau, and/or any other financial institution or data source by embedding the data in, or on, a computer program product, as defined herein and providing the computer program product to the provider of computing system implemented financial management system and/or the process for providing a dynamic financial caricature graphic.

In one embodiment, the financial data associated with a user is provided to, and/or entered into, and/or transferred to, and/or downloaded to, and/or otherwise obtained by, the process for providing a dynamic financial caricature graphic, and/or a computing system implemented financial management system, from the user, a bank, credit card company, a credit reporting agency or bureau, and/or any other financial institution or data source by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at he time of filing or as thereafter developed.

In one embodiment, the financial data associated with a user obtained from one or more sources is then aggregated and/or categorized/re-categorized by the process for providing a dynamic financial caricature graphic. In one embodiment, the financial data associated with a user obtained from one or more sources is analyzed to identify one or more attributes associated with the financial data such as, but not limited to: activity in one or more of financial accounts, such as a credit or debit account; specific financial transactions; financial transactions in specific financial transaction categories, such as entertainment, clothing, or groceries; financial transactions in specified timeframes, such as a year, month, week, day; financial transactions involving specific payees, such as specific stores, restaurants, etc.; overall general spending or historical spending in specific categories; percentages of income and/or income classes spent in specific categories and/or with specific payees; and/or any other financial activity.

In one embodiment, a dynamic financial caricature graphic that is a visual representation of the user and the user's financial situation is then generated.

As an example, in one embodiment, if the user is a person or a family, a dynamic financial caricature graphic that is a visual representation of the user and/or the user's family as a person(s) or character(s) is generated. These types of visual representations are commonly called "avatars". In some cases, a dynamic financial caricature graphic that is a visual representation of the user can be relatively detailed and incorporate physical characteristics of the user such as sex, hair color, skin type, eye color, etc. In some cases, a dynamic financial caricature graphic that is a visual representation of the user can include a digital image of the user. In some cases, the dynamic financial caricature graphic is a visual representation of the user that is highly stylized, a generic representation, and/or is a character the user chooses. In some cases a dynamic financial caricature graphic that is a visual representation of the user can be customized by the user by the user choosing one or more stock elements to add to his or her dynamic financial caricature graphic.

As another example, in one embodiment, if the user is a business owner and/or operator, a dynamic financial caricature graphic that is a visual representation of the business as a building, a trademark, or other representation of the business is generated and/or customized by the user.

In one embodiment, a dynamic financial caricature graphic that is a visual representation of the user and/or the user's business is given specific visual characteristics based on the financial data associated with the user and/or identified one or more attributes associated with the financial data.

As an example, when a dynamic financial caricature graphic is a visual representation of the user, the visible physical characteristics of the visual representation of the user can be generated to reflect the identified one or more defined attributes associated with the financial data for the user. As an even more specific example, if an analysis of the financial data associated with the user indicates a disproportionate amount of transactions associated with eating out or food, the visual representation of the user can be shown as being overweight. As another example, if an analysis of the financial data associated with the user indicates a significant amount of transactions associated with a given retail store, a visual representation of the user can be shown to include a shopping bag having a logo or trademark associated with the retail store on it.

As another example, when the dynamic financial caricature graphic is a visual representation of a business, the visible physical characteristics of the visual representation of the business can be changed to reflect the identified one or more attributes associated with the financial data for the business. As an even more specific example, if an analysis of the financial data associated with the business indicates a backlog of inventory, the visual representation of the business can be shown as a building literally bulging with stock. As another example, if an analysis of the financial data associated with the business indicates a significant amount of sales, the visual representation of the business can be shown to include money, piles of money, or a cash symbol.

In various embodiments, the one or more defined attributes associated with the financial data, the specific dynamic financial caricature graphic used, and the specific visual characteristics of the dynamic financial caricature graphic based on the financial data used, are all implementation choices made by the user and/or the process for providing a dynamic financial caricature graphic. Therefore, numerous specific defined attributes, financial caricature graphics, and visual characteristics are possible. Consequently, the specific examples discussed above do not limit the scope of the claims presented below.

In one embodiment, the user's financial data is then monitored and/or updated and analyzed periodically to identify one or more new attributes associated with the updated financial data and/or changes in the previously identified attributes associated with the financial data.

In one embodiment, if one or more new attributes associated with the updated financial data and/or changes in the previously identified attributes associated with the financial data are found, then one or more visible physical characteristics of the dynamic financial caricature graphic are changed to reflect the identified one or more new attributes associated with the financial data and/or changes in the previously identified attributes associated with the financial data.

As an example, when the dynamic financial caricature graphic is a visual representation of the user, the visible physical characteristics of the visual representation of the user can be changed to reflect identified one or more new attributes associated with the updated financial data and/or changes in the previously identified attributes associated with the financial data. As an even more specific example, if an analysis of the updated financial data associated with the user indicates an increase in amount of transactions associated with eating out or food, the visual representation of the user can be shown as gaining weight. As another example, if an analysis of the updated financial data associated with the user indicates a significant amount of transactions associated with a new retail store, the visual representation of the user can be changed to include a shopping bag having a logo or trademark associated with the new retail store on it.

As another example, when the dynamic financial caricature graphic is a visual representation of a business, the visible physical characteristics of the visual representation of the business can be changed to reflect the identified one or more new attributes associated with the updated financial data and/or changes in the previously identified attributes associated with the financial data for the business. As an even more specific example, if an analysis of the updated financial data associated with the business indicates a new delivery of inventory, the visual representation of the business can be shown as a building literally bulging with stock. As another example, if an analysis of the updated financial data associated with the business indicates a decrease in sales, the visual representation of the business can be shown to include less money, money piles, or a smaller cash symbol.

As noted above, in various embodiments, the one or more defined attributes associated with the financial data, the specific financial caricature graphic used, and the specific visual characteristics based on the financial data used, are all implementation choices made by the user and/or the process for providing a dynamic financial caricature graphic. Therefore, numerous specific defined attributes, financial caricature graphics, and visual characteristics are possible. Consequently, the specific examples discussed above do not limit the scope of the claims presented below.

In one embodiment, the dynamic financial caricature graphic is continuously displayed to the user as a home screen display graphic and/or widget and the user's financial data is monitored and/or updated and analyzed periodically to identify one or more new attributes associated with the updated financial data and/or changes in the previously identified attributes associated with the financial data. In one embodiment, the visible physical characteristics of the dynamic financial caricature graphic is then also changed whenever one or more new attributes associated with the financial data and/or changes in the previously identified attributes associated with the financial data are identified.

Using the process for providing a dynamic financial caricature graphic, as disclosed herein, a user can literally see his of her financial status and/or changes in his or her financial data at a glance. In addition, using the process for providing a dynamic financial caricature graphic, as disclosed herein, the information is presented in an entertaining and intuitive display that, in one embodiment, is automatically updated. Consequently, a user is far more likely to adopt, and continue to use, a computing system implemented financial management system implementing the process for providing a dynamic financial caricature graphic, as disclosed herein.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Figure 1:
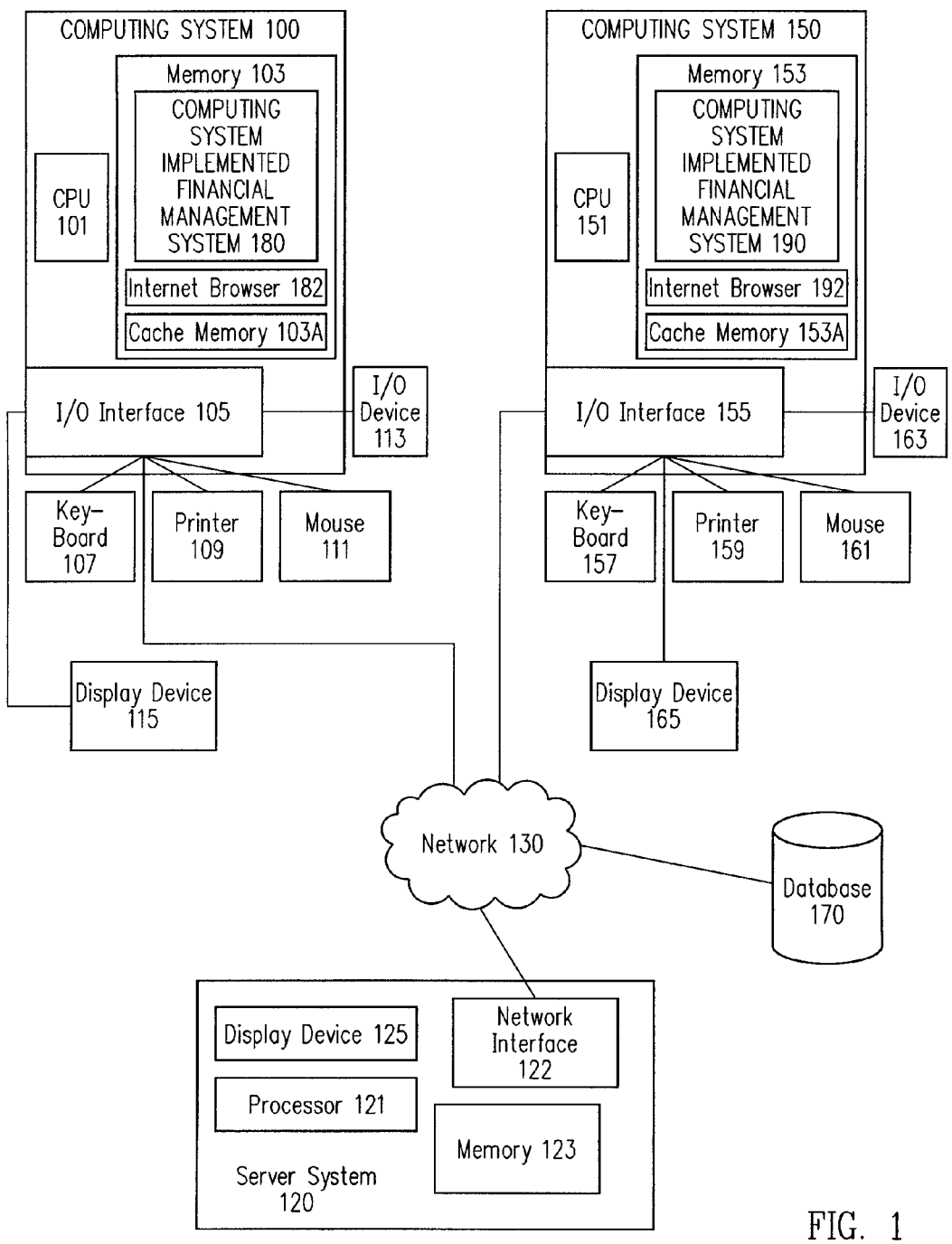
FIG. 1 is a block diagram of an exemplary hardware architecture for implementing one embodiment.

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing a dynamic financial caricature graphic includes a process for providing a dynamic financial caricature graphic whereby financial data associated with a user is obtained from one or more sources. In one embodiment, the financial data associated with a user obtained from one or more sources includes, but is not limited to, data associated with specific financial transactions, financial transaction categories, and/or transaction timeframes, and/or payees. In one embodiment, the financial data associated with a user obtained from one or more sources is first categorized by a computing system implemented financial management system and/or the user. In one embodiment, the financial data associated with a user obtained from one or more sources is then aggregated and/or categorized/re-categorized by the process for providing a dynamic financial caricature graphic to generate a dynamic financial caricature graphic that is a visual representation of the user and includes visual features/characteristics indicating attributes associated with the user's financial situation. In one embodiment, the visual features/characteristics of the dynamic financial caricature graphic, such as size, weight, height, clothing, color, accessories, etc., are chosen by the process for providing a dynamic financial caricature graphic based on the financial data associated with a user obtained from one or more sources and/or one or more criteria provided by the process for providing a dynamic financial caricature graphic and/or the user. In one embodiment, the user's financial data is then monitored and the visual characteristics of the dynamic financial caricature graphic are changed and/or updated in accordance with changes in the financial data associated with the user obtained from the one or more sources.

FIG. 1 is a block diagram of an exemplary hardware architecture for implementing one embodiment of a system and method for providing a dynamic financial caricature graphic, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for providing a dynamic financial caricature graphic (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing a dynamic financial caricature graphic, and/or a computing system implemented financial management system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, financial data associated with one or more users is stored, in whole, or in part, in memory system 103, and is used by, or is accessed by, a process for providing a dynamic financial caricature graphic and/or one or more users. In one embodiment, computing system 100 is a computing system accessible by one or more users. In one embodiment, computing system 100 is used, and/or accessible, by another computing system, such as computing system 150 (discussed below).

In one embodiment, computing system 100 is used, controlled, and/or accessible by, a provider of and/or a computing system implemented financial management system and data representing all, or part, of financial data associated with one or more users, and/or data used to generate one or more dynamic financial caricature graphics, is stored in computing system 100, typically in accounts associated with a given user.

Computing system 100 can be any computing system as defined herein and/or as known in the art at the time of filing and/or as developed thereafter, that includes components that can execute all, or part, of a process for providing a dynamic financial caricature graphic, and/or a computing system implemented financial management system, in accordance with at least one of the embodiments as described herein.

Similarly, computing system 150 typically includes a CPU 150, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented financial management system 190, such as any computing system implemented financial management system defined herein, known in the art at the time of filing, and/or as developed thereafter.

In one embodiment, computing system implemented financial management system 190 is stored, in whole, or in part, in memory system 153, and is used by, or includes, or is accessed by, a process for providing a dynamic financial caricature graphic.

In one embodiment, financial data associated with one or more users, and/or data used to generate one or more dynamic financial caricature graphics, is stored, in whole, or in part, in memory system 153, and is used by, or is accessed by, a process for providing a dynamic financial caricature graphic and/or one or more users. In one embodiment, computing system 150 is a computing system accessible by one or more users. In one embodiment, computing system 150 is used, and/or accessible, by another computing system, such as computing system 100.

In one embodiment, computing system 150 is used, controlled, and/or accessible by, a provider of and/or a computing system implemented financial management system and data representing all, or part, of financial data associated with one or more users is stored in computing system 150, typically in accounts associated with a given user.

Computing system 150 can be any computing system as defined herein and/or as known in the art at the time of filing and/or as developed thereafter, that includes components that can execute all, or part, of a process for providing a dynamic financial caricature graphic, and/or a computing system implemented financial management system, in accordance with at least one of the embodiments as described herein.

As discussed in more detail below, in one embodiment, all, or part, of a process for providing a dynamic financial caricature graphic, and/or a computing system implemented financial management system, and/or financial data associated with one or more users, and/or data used to generate one or more dynamic financial caricature graphics, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a given consumer and/or user, and/or one or more agents for a given consumer and/or user, and/or a process for providing a dynamic financial caricature graphic, and/or a computing system implemented financial management system.

In one embodiment, financial data associated with one or more users, and/or data used to generate one or more dynamic financial caricature graphics, is stored, in whole, or in part, in database 170, and is used by, or is accessed by, a process for providing a dynamic financial caricature graphic. In one embodiment, database 170 is accessible by one or more users. In one embodiment, database 170 is used, and/or accessible, by a computing system, such as computing systems 100 and/or 150, and/or a server system, such as sever system 120 (discussed below).

In one embodiment, database 170 is used, controlled, and/or accessible by, a provider of and/or a computing system implemented financial management system and data representing all, or part, of financial data associated with one or more users is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, financial data associated with one or more users is stored, in whole, or in part, in server system 120, and is used by, or is accessed by, a process for providing a dynamic financial caricature graphic. In one embodiment, server system 120 is accessible by one or more users. In one embodiment, server system 120 is used, and/or accessible, by a computing system, such as computing systems 100 and/or 150, and/or one or more databases, such as database 170.

In one embodiment, server system 120 is used, controlled, and/or accessible by, a provider of and/or a computing system implemented financial management system and data representing all, or part, of financial data associated with one or more users, and/or data used to generate one or more dynamic financial caricature graphics, is stored in server system 120.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, one or more embodiments. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for providing a dynamic financial caricature graphic, and/or a computing system implemented financial management system, and/or financial data associated with one or more users, and/or data used to generate one or more dynamic financial caricature graphics, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing a dynamic financial caricature graphic, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing a dynamic financial caricature graphic and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 150, or server system processor 121. In one embodiment, execution of a process by CPU 101, CPU 150, or server system processor 121, results in the operations of an agent computer process (not shown) and/or a rule computer process (not shown).

In one embodiment, a process for providing a dynamic financial caricature graphic, and/or a computing system implemented financial management system, and/or financial data associated with one or more users, and/or data used to generate one or more dynamic financial caricature graphics, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user" and "consumer" include any person, party, business, system, application, organization, and/or entity interacting with, interfacing with, contacting, viewing, accepting data from, requesting data from, and/or otherwise associating with the process for providing a dynamic financial caricature graphic for any purpose.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented financial management system" includes, but is not limited to: computing system implemented online banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filing or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a system and method for providing a dynamic financial caricature graphic includes a process for providing a dynamic financial caricature graphic whereby financial data associated with a user is obtained from one or more sources. In one embodiment, the financial data associated with a user obtained from one or more sources includes, but is not limited to, data associated with specific financial transactions, financial transaction categories, and/or transaction timeframes, and/or payees. In one embodiment, the financial data associated with a user obtained from one or more sources is first categorized by a computing system implemented financial management system and/or the user. In one embodiment, the financial data associated with a user obtained from one or more sources is then aggregated and/or categorized/re-categorized by the process for providing a dynamic financial caricature graphic to generate a dynamic financial caricature graphic that is a visual representation of the user and includes visual features/characteristics indicating attributes associated with the user's financial situation. In one embodiment, the visual features/characteristics of the dynamic financial caricature graphic, such as size, weight, height, clothing, color, accessories, etc., are chosen by the process for providing a dynamic financial caricature graphic based on the financial data associated with a user obtained from one or more sources and/or one or more criteria provided by the process for providing a dynamic financial caricature graphic and/or the user. In one embodiment, the user's financial data is then monitored and the visual characteristics of the dynamic financial caricature graphic are changed and/or updated in accordance with changes in the financial data associated with the user obtained from the one or more sources.

Figure 2:
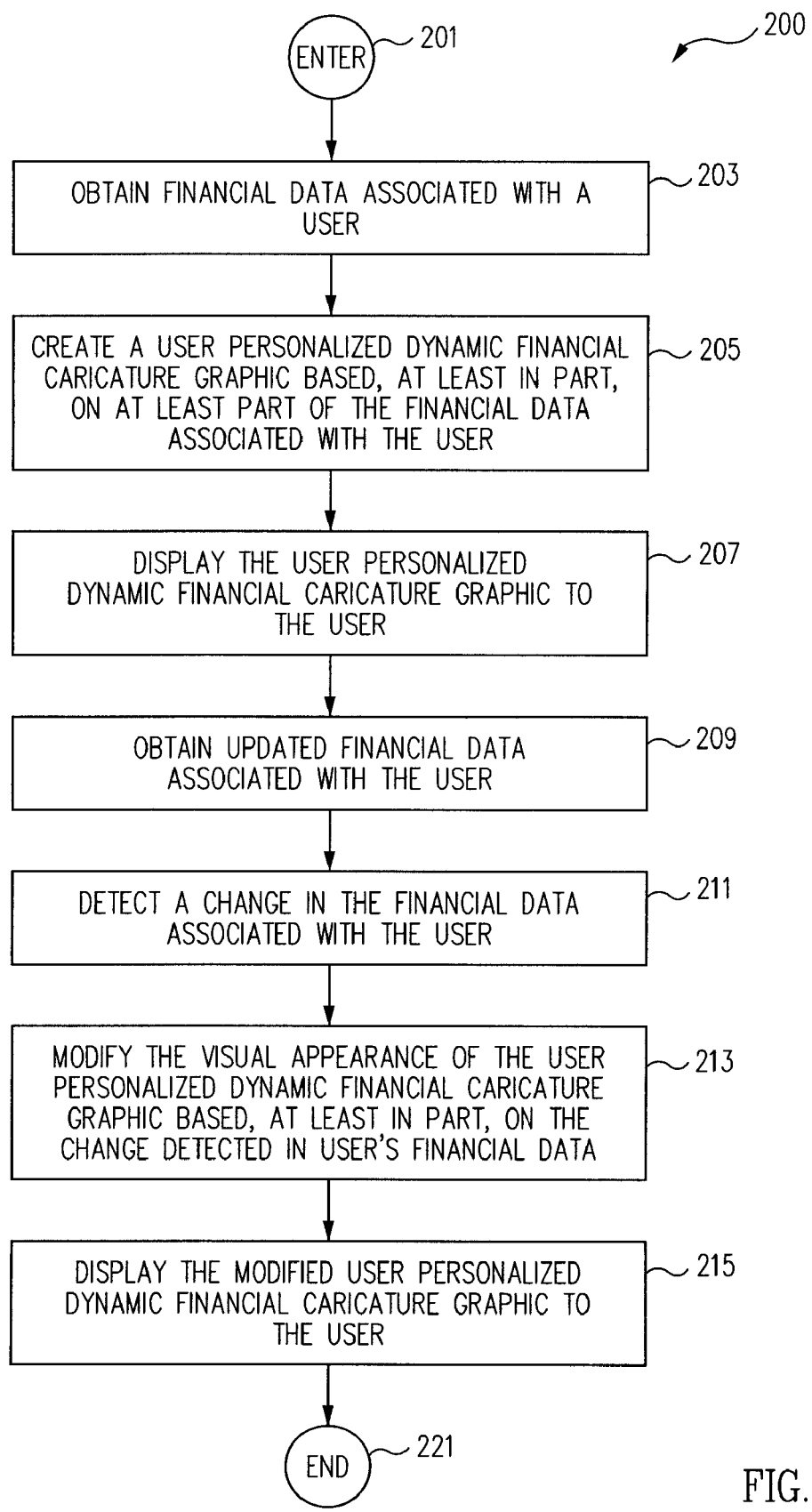
FIG. 2 is a flow chart depicting a process for providing a dynamic financial caricature graphic in accordance with one embodiment.

FIG. 2 is a flow chart depicting a process for providing a dynamic financial caricature graphic 200 in accordance with one embodiment. Process for providing a dynamic financial caricature graphic 200 begins at ENTER OPERATION 201 and process flow proceeds to OBTAIN FINANCIAL DATA ASSOCIATED WITH A USER OPERATION 203.

In one embodiment, at OBTAIN FINANCIAL DATA ASSOCIATED WITH A USER OPERATION 203 a computing system implemented financial management system, such as computing system implemented financial management system 180 and/or computing system implemented financial management system 190, is used to obtain financial data associated with a user representing various financial accounts, and specific financial transactions, and to categorize the transactions and/or accounts, associated with a given user.

In accordance with one embodiment, the financial data associated with a user obtained at OBTAIN FINANCIAL DATA ASSOCIATED WITH A USER OPERATION 203 includes, but is not limited to, any of the following: data representing any activity in one or more of various financial accounts; data representing specific financial transactions; data representing financial transactions in specific financial transaction categories; data representing financial transactions in specified timeframes; data representing financial transactions involving specific payees; data representing overall spending in specific categories and/or timeframes; and/or any other financial data associated with the user as designated by the user and/or the process for providing a dynamic financial caricature graphic.

As noted above, various computing system implemented financial management systems are available including: computing system implemented personal and small business financial management systems; on-line banking systems; computing system implemented tax preparation systems; computing system implemented business accounting systems; computing system implemented inventory management systems and computing system implemented medical expense management systems; as well as various other electronic transaction data driven financial management systems.

As also noted above, as used herein, the term computing system implemented financial management system includes, but is not limited to: computing system implemented business systems, packages, programs, modules, or applications; on-line banking management systems, packages, programs, modules, or applications; computing system implemented personal and small business financial management systems, packages, programs, modules, or applications; computing system implemented inventory management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications.

As also noted above, computing system implemented financial management systems help users manage their finances by providing a centralized interface with banks, credit card companies, and other various financial institutions, for identifying and categorizing user financial transactions. Computing system implemented financial management systems typically obtain electronic transaction based information, such as payee, payment amount, date, etc. via communication with banks, credit card providers, or other financial institutions, using electronic data transfer systems such as the Open Financial Exchange (OFX) specification, or various systems for transferring financial transaction data.

In one embodiment the financial data associated with the user is provided to process for providing a dynamic financial caricature graphic 200 and/or a computing system implemented financial management system and the transactions represented by the data are categorized by the user.

In one embodiment, the financial data associated with the user is provided to, and/or entered into, and/or transferred to, and/or downloaded to, and/or otherwise obtained by, process for providing a dynamic financial caricature graphic 200, and/or a computing system implemented financial management system, at OBTAIN FINANCIAL DATA ASSOCIATED WITH A USER OPERATION 203 from the user, a bank, credit card company, a credit reporting agency or bureau, and/or any other financial institution or data source via any network or network system such as, network 130 of FIG. 1, as discussed herein, and/or available or known at the time of filing, and/or as later developed.

Returning to FIG. 2, in one embodiment, the financial data associated with the user is provided to, and/or entered into, and/or transferred to, and/or downloaded to, and/or otherwise obtained by, process for providing a dynamic financial caricature graphic 200, and/or a computing system implemented financial management system, at OBTAIN FINANCIAL DATA ASSOCIATED WITH A USER OPERATION 203 from the user, a bank, credit card company, a credit reporting agency or bureau, and/or any other financial institution or data source through a user interface device, such as a keyboard, mouse, touchpad, voice recognition software, or any other device and/or system capable of providing user input to a computing system and/or for translating user actions into computing system operations, whether available or known at the time of filing or as developed later, such as keyboards 107, 157, and/or mice 111, 161 of FIG. 1 and/or a user interface screen.

Returning to FIG. 2, in one embodiment, the financial data associated with the user is provided to, and/or entered into, and/or transferred to, and/or downloaded to, and/or otherwise obtained by, process for providing a dynamic financial caricature graphic 200, and/or a computing system implemented financial management system, at OBTAIN FINANCIAL DATA ASSOCIATED WITH A USER OPERATION 203 from a database maintained by the user, a bank, a credit card company, credit reporting agency or bureau, and/or any other financial institution or data source, such as computing systems 100, 150 and 120 of FIG. 1 as discussed herein, and/or available or known at the time of filing, and/or as later developed.

Returning to FIG. 2, in one embodiment, the financial data associated with the user is provided to, and/or entered into, and/or transferred to, and/or downloaded to, and/or otherwise obtained by, process for providing a dynamic financial caricature graphic 200, and/or a computing system implemented financial management system, at OBTAIN FINANCIAL DATA ASSOCIATED WITH A USER OPERATION 203 from the user, a bank, credit card company, a credit reporting agency or bureau, and/or any other financial institution or data source by embedding the data in, or on, a computer program product, as defined herein and providing the computer program product to the provider of computing system implemented financial management system and/or process for providing a dynamic financial caricature graphic 200.

In one embodiment, the financial data associated with the user is provided to, and/or entered into, and/or transferred to, and/or downloaded to, and/or otherwise obtained by, process for providing a dynamic financial caricature graphic 200, and/or a computing system implemented financial management system, at OBTAIN FINANCIAL DATA ASSOCIATED WITH A USER OPERATION 203 from the user, a bank, credit card company, a credit reporting agency or bureau, and/or any other financial institution or data source by any method, apparatus, process or mechanism for transferring data from one or more devices, computing systems, server systems, databases, web site/web functions and/or any devices to one or more other devices, computing systems, server systems, databases, web site/web functions and/or any devices, whether known at he time of filing or as thereafter developed.

Methods, means, and mechanisms for providing, entering, transferring, downloading, and/or otherwise obtaining data are well known to those of skill in the art. Consequently a more detailed discussion of the methods, means, and mechanisms for providing, entering, transferring, downloading, and/or otherwise obtaining data are omitted here to avoid detracting from the invention.

In one embodiment, once the financial data associated with the user is provided to, and/or entered into, and/or transferred to, and/or downloaded to, and/or otherwise obtained by, process for providing a dynamic financial caricature graphic 200 at OBTAIN FINANCIAL DATA ASSOCIATED WITH A USER OPERATION 203, the data is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 150, described above. In one embodiment, the data, in whole, or in part, is stored in any computing device and/or server system, such as computing systems 100, 150, or server system 120, or other device, in another location, or on/in computer readable medium, and/or any other computer program product, as defined herein. In one embodiment, the data, in whole, or in part, is stored on a webpage or in a web-based system.

Returning to FIG. 2, in some embodiments, the means for storing the data described above are maintained, in whole, or in part, by: the user, or a user computing system; a financial institution; the provider of a parent computing system implemented financial management system employing process for providing a dynamic financial caricature graphic 200; the provider of process for providing a dynamic financial caricature graphic 200; a third party service; or any other parties.

In one embodiment, once the financial data associated with the user is provided to, and/or entered into, and/or transferred to, and/or downloaded to, and/or otherwise obtained by, process for providing a dynamic financial caricature graphic 200 at OBTAIN FINANCIAL DATA ASSOCIATED WITH A USER OPERATION 203, process flow proceeds to CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205.

According to one embodiment, at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205, the financial data associated with a user obtained from one or more sources at OBTAIN FINANCIAL DATA ASSOCIATED WITH A USER OPERATION 203 is then aggregated and/or categorized/recategorized by process for providing a dynamic financial caricature graphic 200 to generate a dynamic financial caricature graphic that is a visual representation of the user and/or the user's financial situation.

In one embodiment, at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 visual characteristics of the dynamic financial caricature graphic, such as size, weight, height, clothing, color, structural features, accessories, etc., are chosen by process for providing a dynamic financial caricature graphic 200 based on the financial data associated with a user obtained from one or more sources and/or one or more criteria provided by the process for providing a dynamic financial caricature graphic and/or the user.

In one embodiment, the financial data associated with a user obtained from one or more sources at OBTAIN FINANCIAL DATA ASSOCIATED WITH A USER OPERATION 203 is analyzed at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 to identify one or more attributes associated with the financial data such as, but not limited to: activity in one or more of financial accounts, such as a credit or debit account; specific financial transactions; financial transactions in specific financial transaction categories, such as entertainment, clothing, or groceries; financial transactions in specified timeframes, such as a year, month, week, day; financial transactions involving specific payees, such as specific stores, restaurants, etc.; overall general spending or historical spending in specific categories; percentages of income and/or income classes spent in specific categories and/or with specific payees; and/or any other financial activity.

In one embodiment, a dynamic financial caricature graphic that is a customized visual representation of the user and the user's financial situation is then generated at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205.

As an example, in one embodiment, at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 if the user is a person or a family, a dynamic financial caricature graphic that is a visual representation of the user and/or the user's family as a person (s) or character(s) is generated. These types of visual representations are commonly called "avatars".

In some cases, a dynamic financial caricature graphic that is a visual representation of the user generated at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 can be relatively detailed and incorporate physical characteristics of the user such as sex, hair color, skin type, eye color, etc. In some cases, a dynamic financial caricature graphic that is a visual representation of the user generated at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 can include a digital image of the user. In some cases, the dynamic financial caricature graphic generated at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 is a visual representation of the user that is highly stylized, and/or is generic, at least in part, and/or is a character the user chooses from a provided selection of stock characters. In some cases, a dynamic financial caricature graphic that is a visual representation of generated at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 is customized by the user and/or created by the user making one or more selections of component parts and/or schemes.

As another example, in one embodiment, if the user is a business owner and/or operator, a dynamic financial caricature graphic that is a visual representation of the business as a building, a trademark, or other representation of the business is generated and/or customized by the user at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205.

In one embodiment, a dynamic financial caricature graphic that is a visual representation of the user and/or the user's business is given specific visual characteristics based on the financial data associated with the user obtained at OBTAIN FINANCIAL DATA ASSOCIATED WITH A USER OPERATION 203 and/or identified one or more attributes associated with the financial data at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205.

As an example, when a dynamic financial caricature graphic is a visual representation of the user, the visible physical characteristics of the visual representation of the user can be generated at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 to reflect the identified one or more defined attributes associated with the financial data for the user. As an even more specific example, if an analysis of the financial data associated with the user at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 indicates a disproportionate amount of transactions associated with eating out or food, the visual representation of the user can be shown as being overweight. As another example, if an analysis of the financial data associated with the user at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 indicates a significant amount of transactions associated with a given retail store, a visual representation of the user can be shown to include a shopping bag having a name, a logo, or trademark associated with the retail store on it.

Figure 3:
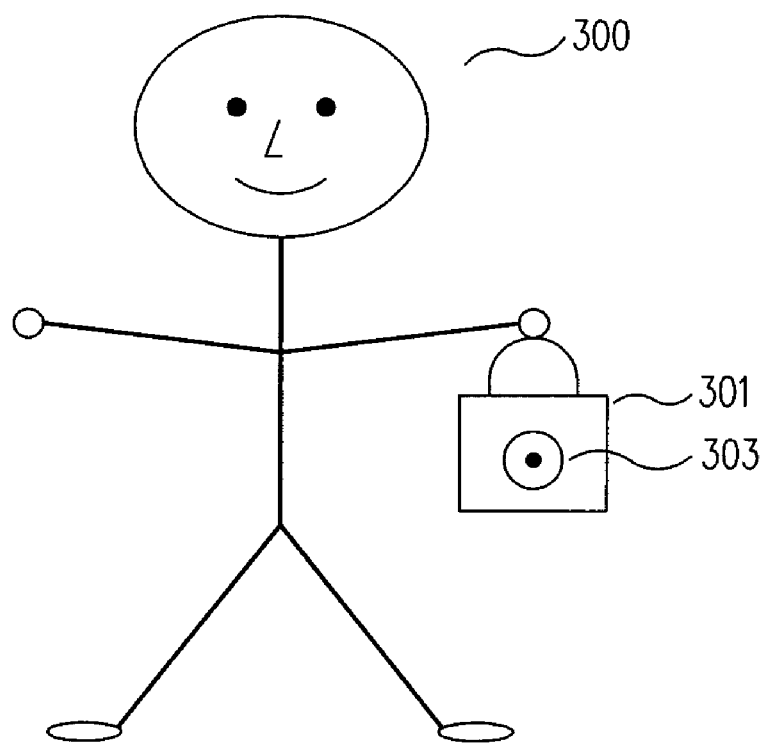
FIG. 3 shows one example of a dynamic financial caricature graphic, in this instance, a personal financial avatar caricature graphic, in accordance with one embodiment created based on a first review of a users financial data.
Figure 3:
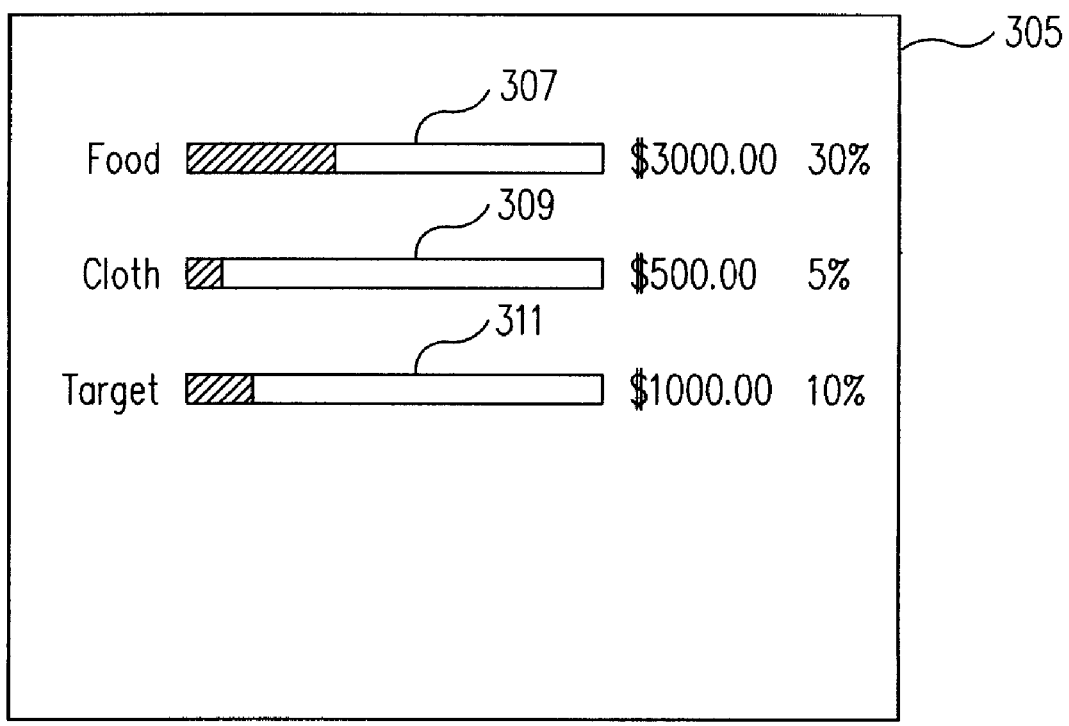

FIG. 3 shows one example of a dynamic financial caricature graphic 300, in this instance a personal financial avatar caricature graphic, in accordance with one embodiment created based on a first analysis of a users financial data at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 (FIG. 2).

As seen in FIG. 3, in this specific example, dynamic financial caricature graphic 300 is a caricature of the user that includes a shopping bag accessory 301 with a store symbol 303 on it. It is also worth noting, for future reference made below in the discussion of FIG. 5, that dynamic financial caricature graphic 300 shows a relatively slim caricature of the user. Also seen in FIG. 3 is data table 305 that includes graphs 307, 309, and 311 indicating amounts spent, and percentages of income used, on food, clothing, and at the retail store Target, respectively. The fact that, in this particular example, only 30% of income is spent on food has resulted in the relatively slim caricature of the user in dynamic financial caricature graphic 300. In addition, the fact that 10% of income was spent at Target in this particular example has resulted in the Target trademark appearing as the store symbol 303 on shopping bag accessory 301.

Returning to FIG. 2 as another example, when the dynamic financial caricature graphic generated at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 is a visual representation of a business, the visible physical characteristics of the visual representation of the business can be changed to reflect the identified one or more attributes associated with the financial data for the business. As an even more specific example, if an analysis of the financial data associated with the business at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 indicates a backlog of inventory, the visual representation of the business can be shown as a building literally bulging with stock. As another example, if an analysis of the financial data associated with the business at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 indicates a significant amount of sales, the visual representation of the business can be shown to include money, piles of money, or a cash symbol.

Figure 4:
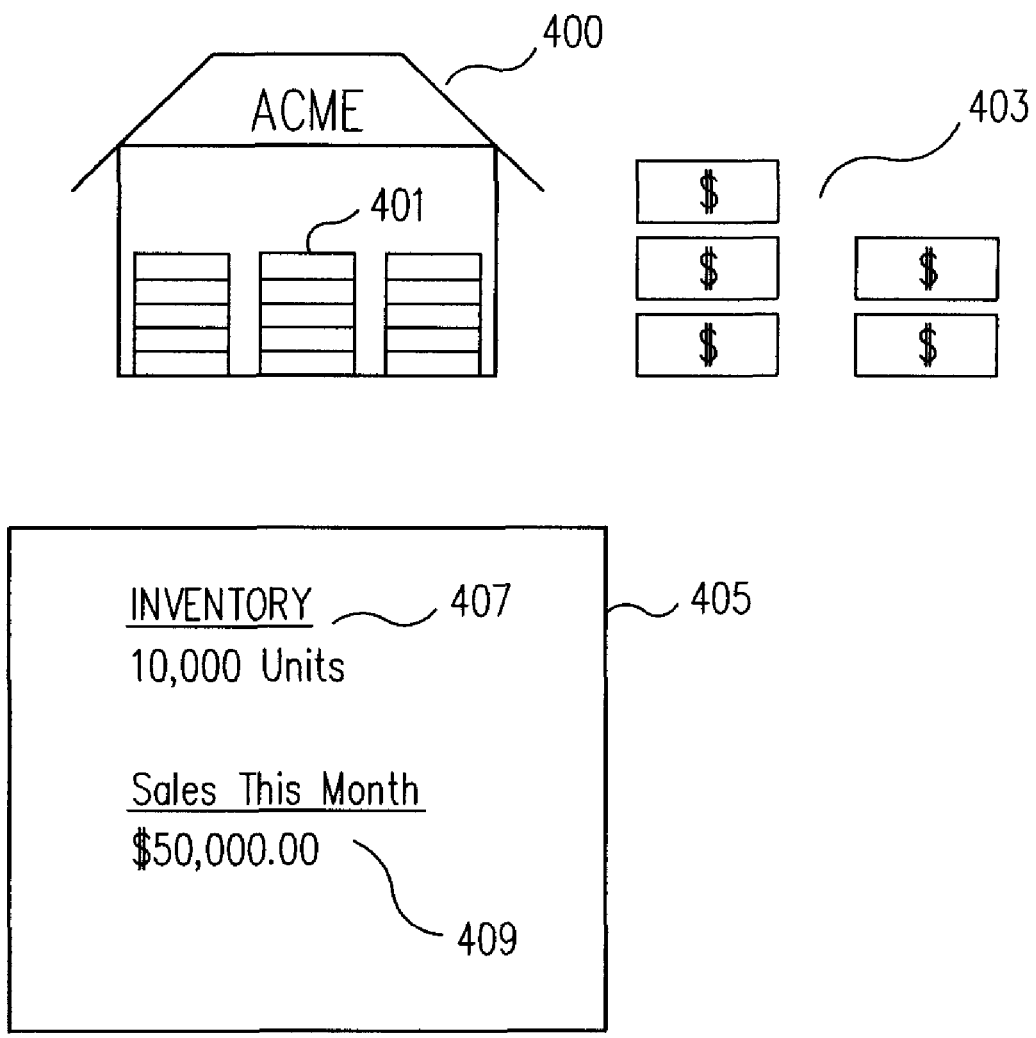
FIG. 4 shows one example of a dynamic financial caricature graphic, in this instance a business dynamic financial caricature graphic, in accordance with one embodiment created based on a first review of a business's financial data.

FIG. 4 shows one example of a dynamic financial caricature graphic 400, in this instance a business dynamic financial caricature graphic, in accordance with one embodiment created based on a first review of a business's financial data.

As seen in FIG. 4, in this specific example, dynamic financial caricature graphic 400 is a caricature of the user's business building that includes inventory stock piles 401 and money symbols 403. As also seen in FIG. 4 is data table 405 that includes data 407 and 409 indicating inventory stocks and sales figures, respectively. The fact that, in this particular example, inventory stocks are at 10,000 units has resulted in inventory stock piles 401 of the shown size. In addition, the fact that sales for the month were at $50,000.00 has resulted in five cash symbols 403.

In various embodiments, the one or more defined attributes associated with the financial data, the specific dynamic financial caricature graphic used, and the specific visual characteristics of the dynamic financial caricature graphic based on the financial data used, are all implementation choices made by the user and/or the process for providing a dynamic financial caricature graphic. Therefore, numerous specific defined attributes, financial caricature graphics, and visual characteristics are possible. Consequently, the specific examples discussed with respect to FIGS. 3 and 4 do not limit the scope of the claims presented below.

Methods, means, and mechanisms for generating graphics are well known to those of skill in the art. Consequently a more detailed discussion of the methods, means, and mechanisms for generating graphics are omitted here to avoid detracting from the invention.

In one embodiment, once the financial data associated with a user obtained from one or more sources at OBTAIN FINANCIAL DATA ASSOCIATED WITH A USER OPERATION 203 is then aggregated and/or categorized/re-categorized by process for providing a dynamic financial caricature graphic 200 to generate a dynamic financial caricature graphic that is a visual representation of the user and/or the user's financial situation at CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205, process flow proceeds to DISPLAY THE USER PERSONALIZED DYNAMIC FINANCIAL CARICATURE GRAPHIC TO THE USER OPERATION 207.

In one embodiment, at DISPLAY THE USER PERSONALIZED DYNAMIC FINANCIAL CARICATURE GRAPHIC TO THE USER OPERATION 207 the user of process for providing a dynamic financial caricature graphic 200 is presented with the dynamic financial caricature graphic of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 on a display device of a computing system, such as display devices 111, 165 or 125 of FIG. 1 or any other device capable of displaying data, whether known at the time of filing or as later developed.

Methods, means, and mechanisms for displaying graphics are well known to those of skill in the art. Consequently a more detailed discussion of the methods, means, and mechanisms for generating graphics are omitted here to avoid detracting from the invention.

Returning to FIG. 2, in one embodiment, once the user of process for providing a dynamic financial caricature graphic 200 is presented with the dynamic financial caricature graphic of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 on a display device of a computing system at DISPLAY THE USER PERSONALIZED DYNAMIC FINANCIAL CARICATURE GRAPHIC TO THE USER OPERATION 207, process flow proceeds to OBTAIN UPDATED FINANCIAL DATA ASSOCIATED WITH THE USER OPERATION 209.

In one embodiment, at OBTAIN UPDATED FINANCIAL DATA ASSOCIATED WITH THE USER OPERATION 209 the user's financial data of OBTAIN FINANCIAL DATA ASSOCIATED WITH A USER OPERATION 203 is then monitored and/or updated and analyzed periodically to identify one or more new attributes associated with the updated financial data and/or changes in the previously identified attributes associated with the financial data.

In one embodiment, at OBTAIN UPDATED FINANCIAL DATA ASSOCIATED WITH THE USER OPERATION 209 the user's financial data of OBTAIN FINANCIAL DATA ASSOCIATED WITH A USER OPERATION 203 is updated at regular intervals as defined by the user and/or process for providing a dynamic financial caricature graphic 200. In one embodiment, at OBTAIN UPDATED FINANCIAL DATA ASSOCIATED WITH THE USER OPERATION 209 the user's financial data of OBTAIN FINANCIAL DATA ASSOCIATED WITH A USER OPERATION 203 is updated whenever there is a change in the financial data of OBTAIN FINANCIAL DATA ASSOCIATED WITH A USER OPERATION 203.

In one embodiment, once the user's financial data of OBTAIN FINANCIAL DATA ASSOCIATED WITH A USER OPERATION 203 is monitored and/or updated and analyzed periodically to identify one or more new attributes associated with the updated financial data and/or changes in the previously identified attributes associated with the financial data at OBTAIN UPDATED FINANCIAL DATA ASSOCIATED WITH THE USER OPERATION 209, process flow proceeds to DETECT A CHANGE IN THE FINANCIAL DATA ASSOCIATED WITH THE USER OPERATION 211.

In one embodiment, at DETECT A CHANGE IN THE FINANCIAL DATA ASSOCIATED WITH THE USER OPERATION 211 one or more new attributes associated with the updated financial data and/or changes in the previously identified attributes associated with the financial data of OBTAIN FINANCIAL DATA ASSOCIATED WITH A USER OPERATION 203 are found. In one embodiment, once one or more new attributes associated with the updated financial data and/or changes in the previously identified attributes associated with the financial data of OBTAIN FINANCIAL DATA ASSOCIATED WITH A USER OPERATION 203 are found at DETECT A CHANGE IN THE FINANCIAL DATA ASSOCIATED WITH THE USER OPERATION 211, process flow proceeds to MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213.

In one embodiment, at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 one or more visible physical characteristics of the dynamic financial caricature graphic of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 are changed to reflect the identified one or more new attributes associated with the financial data and/or changes in the previously identified attributes associated with the financial data of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205.

As an example, when the dynamic financial caricature graphic of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 is a visual representation of the user, the visible physical characteristics of the visual representation of the user of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 are changed at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 to reflect identified one or more new attributes associated with the updated financial data and/or changes in the previously identified attributes associated with the financial data of DETECT A CHANGE IN THE FINANCIAL DATA ASSOCIATED WITH THE USER OPERATION 211.

As an even more specific example, if an analysis of the updated financial data associated with the user at DETECT A CHANGE IN THE FINANCIAL DATA ASSOCIATED WITH THE USER OPERATION 211 indicates an increase in amount of transactions associated with eating out or food, the visual representation of the user can be changed at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 to show the visual representation of the user as gaining weight.

As another example, if an analysis of the updated financial data associated with the user at DETECT A CHANGE IN THE FINANCIAL DATA ASSOCIATED WITH THE USER OPERATION 211 indicates a significant amount of transactions associated with a new retail store, the visual representation of the user can be changed at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 to include a shopping bag having a logo or trademark associated with the new retail store on it.

Figure 5:
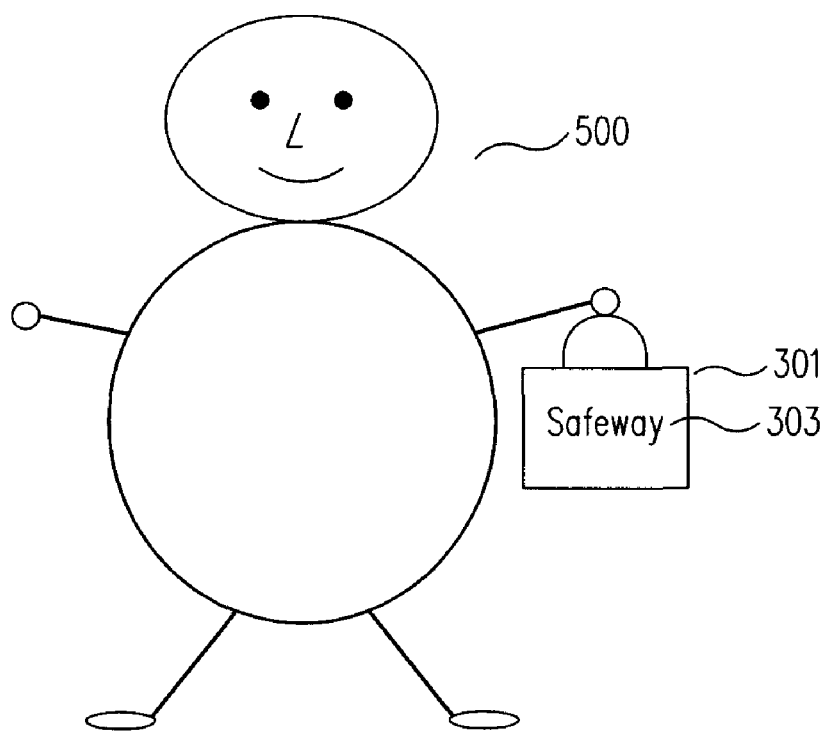
FIG. 5 shows one example of the dynamic financial caricature graphic of FIG. 3, in this instance a personal financial avatar caricature graphic, in accordance with one embodiment created based on a second, later, review of a user's financial data that reflects a change in the user's financial data.
Figure 5:
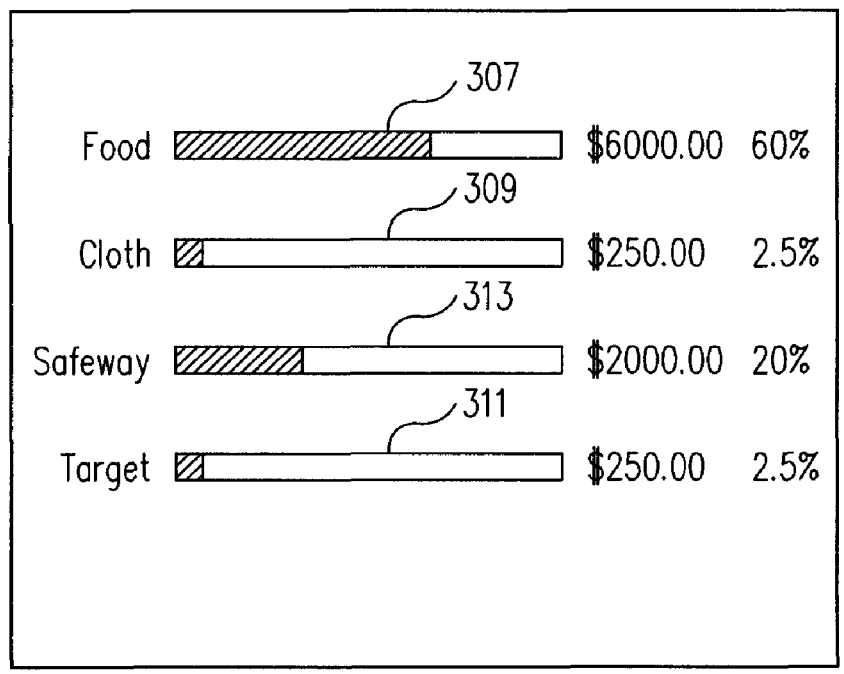

FIG. 5 shows one example of the modified dynamic financial caricature graphic 500 that is a modified form of dynamic financial caricature graphic 300 of FIG. 3, generated based on a second, later, review of a user's financial data at OBTAIN UPDATED FINANCIAL DATA ASSOCIATED WITH THE USER OPERATION 209 (FIG. 2) that reflects a change in the user's financial data at DETECT A CHANGE IN THE FINANCIAL DATA ASSOCIATED WITH THE USER OPERATION 211 (FIG. 2).

As seen in FIG. 5, in this specific example, dynamic financial caricature graphic 500 is a caricature of the user similar to dynamic financial caricature graphic 300, of FIG. 3. As seen in FIG. 5, in this specific example, dynamic financial caricature graphic 500 includes shopping bag accessory 301 with a store symbol 303 on it. It is also worth noting that dynamic financial caricature graphic 500 shows a caricature of the user that is significantly heavier than dynamic financial caricature graphic 300, of FIG. 3. Also seen in FIG. 5 is data table 305 that again includes graphs 307, 309, and 311 indicating amounts spent, and percentages of income used, on food, clothing, and at the retail store Target, respectively, and a new graph 311 showing the percentage of income spent at Safeway grocery store. The fact that, in this particular example, 60% of income is spent on food has resulted in the relatively heavy caricature of the user in dynamic financial caricature graphic 500, as opposed to the relatively slim caricature of the user in dynamic financial caricature graphic 300 of FIG. 3. Returning to FIG. 5. In addition, the fact that 20% of income was spent at Safeway Grocery store in this particular example has resulted in the Safeway logo replacing the Target trademark (FIG. 3) as the store symbol 303 on shopping bag accessory 301 in FIG. 5.

As another example, when the dynamic financial caricature graphic of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 is a visual representation of a business, the visible physical characteristics of the visual representation of the business can be changed at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 to reflect the identified one or more new attributes associated with the updated financial data and/or changes in the previously identified attributes associated with the financial data for the business of DETECT A CHANGE IN THE FINANCIAL DATA ASSOCIATED WITH THE USER OPERATION 211.

As an even more specific example, if an analysis of the updated financial data associated with the business at OBTAIN UPDATED FINANCIAL DATA ASSOCIATED WITH THE USER OPERATION 209 indicates a new delivery of inventory, the visual representation of the business can be changed at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 to show a building literally bulging with stock.

As another example, if an analysis of the updated financial data associated with the business at OBTAIN UPDATED FINANCIAL DATA ASSOCIATED WITH THE USER OPERATION 209 indicates a decrease in sales, the visual representation of the business can be changed at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 to show less money, money piles, or a smaller cash symbol.

Figure 6:
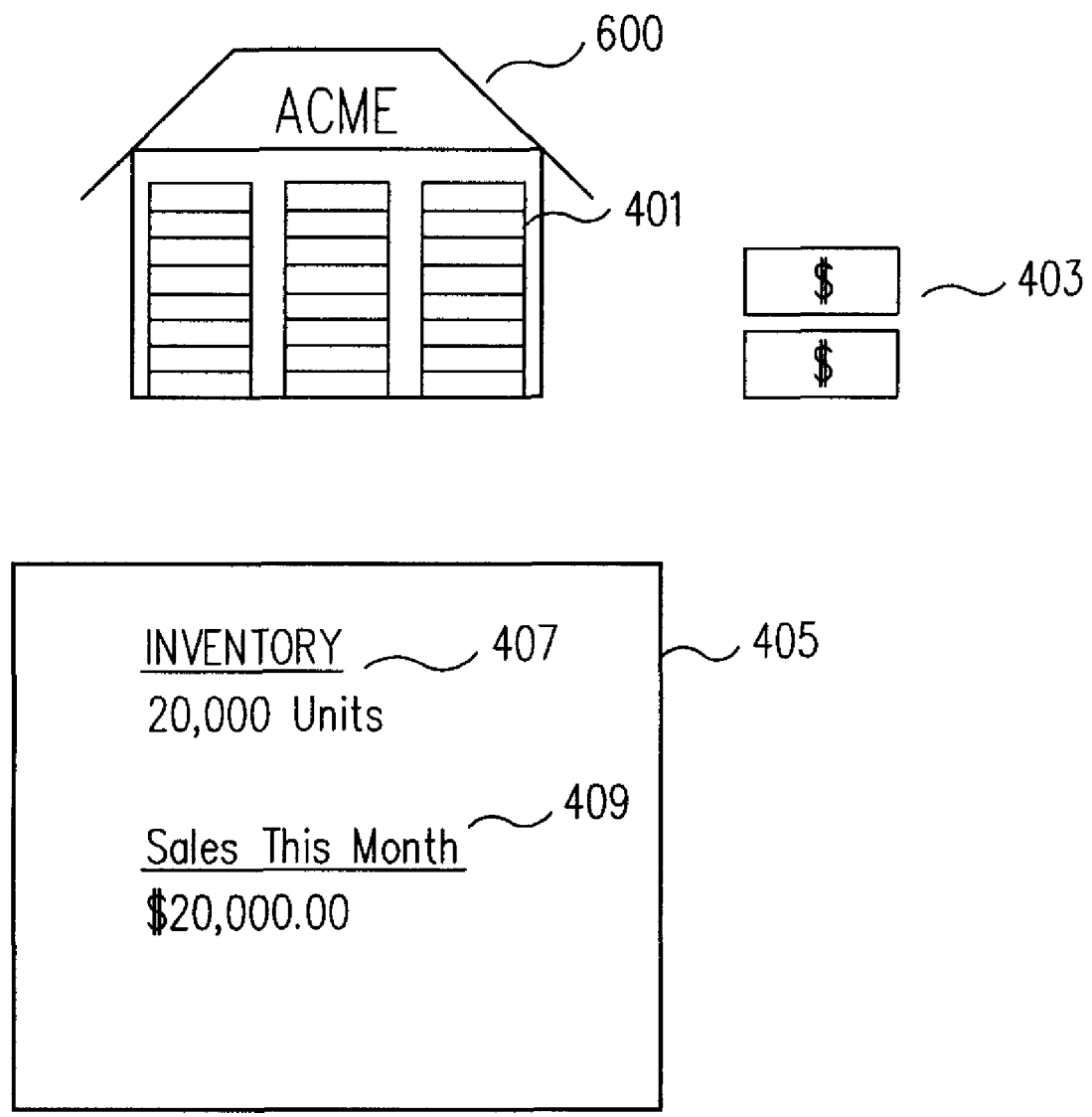
FIG. 6 shows one example of the dynamic financial caricature graphic of FIG. 4, in this instance a business financial caricature graphic, in accordance with one embodiment created based on a second, later, review of a business's financial data that reflects a change in the business's financial data.

FIG. 6 shows one example of a modified dynamic financial caricature graphic 600 that is a modified version of dynamic financial caricature graphic 400 of FIG. 4, created at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 based on a second, later, review of a user's financial data at OBTAIN UPDATED FINANCIAL DATA ASSOCIATED WITH THE USER OPERATION 209 that reflects a change in the user's financial data found at DETECT A CHANGE IN THE FINANCIAL DATA ASSOCIATED WITH THE USER OPERATION 211.

As seen in FIG. 6, in this specific example, dynamic financial caricature graphic 600 is a caricature of the user's business building that is similar to dynamic financial caricature graphic 400 of FIG. 4. As seen in FIG. 6, dynamic financial caricature graphic 600 includes inventory stock piles 401 and money symbols 403. As also seen in FIG. 4 is data table 405 that includes data 407 and 409 indicating inventory stocks and sales figures, respectively. The fact that, in this particular example, inventory stocks are at 20,000 units has resulted in inventory stock piles 401 of the shown size that are larger than the inventory stock piles 401 of FIG. 4. In addition, the fact that sales for the month were at $20,000.00 has resulted in two cash symbols 403 in contrast to the five cash symbols 403 in FIG. 4.

As noted above, in various embodiments, the one or more defined attributes associated with the financial data, the specific financial caricature graphic used, and the specific visual characteristics based on the financial data used, are all implementation choices made by the user and/or the process for providing a dynamic financial caricature graphic. Therefore, numerous specific defined attributes, financial caricature graphics, and visual characteristics are possible. Consequently, the specific examples discussed above with respect to FIGS. 5 and 6 do not limit the scope of the claims presented below.

In one embodiment, once one or more visible physical characteristics of the dynamic financial caricature graphic of CREATE A USER PERSONALIZED DYNAMIC FINANCIAL CARICATURE GRAPHIC BASED, AT LEAST IN PART, ON AT LEAST PART OF THE FINANCIAL DATA ASSOCIATED WITH THE USER OPERATION 205 are changed to reflect the identified one or more new attributes associated with the financial data and/or changes in the previously identified attributes associated with the financial data of OBTAIN FINANCIAL DATA ASSOCIATED WITH A USER OPERATION 203 at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213, process flow proceeds to DISPLAY THE MODIFIED USER PERSONALIZED DYNAMIC FINANCIAL CARICATURE GRAPHIC TO THE USER OPERATION 215.

In one embodiment, at DISPLAY THE MODIFIED USER PERSONALIZED DYNAMIC FINANCIAL CARICATURE GRAPHIC TO THE USER OPERATION 215 the user of process for providing a dynamic financial caricature graphic 200 is presented with the dynamic financial caricature graphic of MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 on a display device of a computing system, such as display devices 111, 165 or 125 of FIG. 1 or any other device capable of displaying data, whether known at the time of filing or as later developed.

In one embodiment, the dynamic financial caricature graphic of MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 is continuously updated and displayed to the user as a home screen display and/or widget and the user's financial data of OBTAIN FINANCIAL DATA ASSOCIATED WITH A USER OPERATION 203 is monitored and/or updated and analyzed periodically at OBTAIN UPDATED FINANCIAL DATA ASSOCIATED WITH THE USER OPERATION 209 to identify one or more new attributes associated with the updated financial data and/or changes in the previously identified attributes associated with the financial data at DETECT A CHANGE IN THE FINANCIAL DATA ASSOCIATED WITH THE USER OPERATION 211. In one embodiment, the visible physical characteristics of the dynamic financial caricature graphic are then also changed at MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 whenever one or more new attributes associated with the financial data and/or changes in the previously identified attributes associated with the financial data are identified.

Methods, means, and mechanisms for displaying graphics are well known to those of skill in the art. Consequently, a more detailed discussion of the methods, means, and mechanisms for generating graphics are omitted here to avoid detracting from the invention.

Returning to FIG. 2, in one embodiment, once the user of process for providing a dynamic financial caricature graphic 200 is presented with the dynamic financial caricature graphic of MODIFY THE VISUAL APPEARANCE OF THE USER PERSONALIZED DYNAMIC FINANCIAL CARICATURE GRAPHIC BASED, AT LEAST IN PART, ON THE CHANGE DETECTED IN USER'S FINANCIAL DATA OPERATION 213 on a display device of a computing system at DISPLAY THE MODIFIED USER PERSONALIZED DYNAMIC FINANCIAL CARICATURE GRAPHIC TO THE USER OPERATION 215, process flow proceeds to EXIT OPERATION 221.

In one embodiment, at EXIT OPERATION 221 process for providing a dynamic financial caricature graphic 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing a dynamic financial caricature graphic 200, a user can literally see his of her financial status and/or changes in his or her financial data at a glance. In addition, using process for providing a dynamic financial caricature graphic 200, the information is presented in an entertaining and intuitive display that, in one embodiment, is automatically updated. Consequently, a user is far more likely to adopt, and continue to use, a computing system implemented financial management system implementing process for providing a dynamic financial caricature graphic 200.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "categorizing", "providing", "adjusting", "modifying", "updating", "displaying" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing a dynamic financial caricature graphic, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing a dynamic financial caricature graphic comprising:
   obtaining financial transaction data associated with a user using a computing system implemented financial management system;
   categorizing the obtained financial transaction data into a plurality of financial categories;
   generating an original dynamic financial caricature graphic of the user, the dynamic financial caricature graphic including two or more different visual characteristics, with each of the at least two characteristics being tied to different respective financial categories, the visual appearance of the two or more visual characteristics being based, at least in part, on the at least part of the financial transaction data associated with the user and visually reflecting a current financial status of the particular financial category associated with the characteristic, wherein the two or more different visual characteristics are chosen from the group consisting of size, weight, height, clothing, and accessories of the original dynamic financial caricature graphic of the user;
   displaying the dynamic financial caricature graphic of the user on a computing system display device;
   monitoring the financial transaction data associated with the user using a computing system implemented financial management system;
   identifying a change in the financial transaction data associated with the user, the identified change being associated with a change in financial status of a financial category associated with a visual characteristic of the dynamic financial caricature graphic;
   modifying the dynamic financial caricature graphic of the user, the modified dynamic financial caricature graphic including one or more changed visual characteristics, the one or more changed visual characteristics being based, at least in part, on the changed financial status of the financial category associated with the changed visual characteristic; and displaying the modified dynamic financial caricature graphic for the user on a computing system display device.

2. The computing system implemented process for providing a dynamic financial caricature graphic of claim 1, wherein:
the dynamic financial caricature graphic of the user is a graphical representation of the user.

3. The computing system implemented process for providing a dynamic financial caricature graphic of claim 2, wherein:
the graphical representation of the user includes one or more visual features chosen from the group of visual features consisting of:
a body type of the graphical representation of the user;
clothing worn by the graphical representation of the user;
accessories included with the graphical representation of the user; and
one or more physical features of the graphical representation of the user.

4. The computing system implemented process for providing a dynamic financial caricature graphic of claim 3, wherein: one of the accessories included with the graphical representation of the user includes a shopping bag.

5. The computing system implemented process for providing a dynamic financial caricature graphic of claim 4, wherein:
the shopping bag includes a symbol representing a store that the financial transaction data associated with a user indicates is frequented by the user.

6. The computing system implemented process for providing a dynamic financial caricature graphic of claim 3, wherein:
one of the accessories included with the graphical representation of the user includes a package.

7. The computing system implemented process for providing a dynamic financial caricature graphic of claim 6, wherein:
the package includes a symbol representing a store that the financial transaction data associated with a user indicates is frequented by the user.

8. The computing system implemented process for providing a dynamic financial caricature graphic of claim 1, wherein:
modifying the dynamic financial caricature graphic of the user comprises modifying one or more characteristics of the dynamic financial caricature graphic chosen from the group of characteristics consisting of:
a body type of a graphical representation of the user;
clothing worn by the graphical representation of the user;
accessories included with the graphical representation of the user; and
any physical features of the graphical representation of the user.

9. The computing system implemented process for providing a dynamic financial caricature graphic of claim 1, wherein:
monitoring the financial transaction data associated with the user using a computing system implemented financial management system comprises updating the financial transaction data associated with the user on a periodic basis.

10. The computing system implemented process for providing a dynamic financial caricature graphic of claim 1, wherein:
monitoring the financial transaction data associated with the user using a computing system implemented financial management system comprises identifying when the financial transaction data associated with the user has changed; and
modifying the dynamic financial caricature graphic of the user comprises modifying one or more characteristics of the dynamic financial caricature graphic when the financial transaction data associated with the user has changed.

11. The computing system implemented process for providing a dynamic financial caricature graphic of claim 1, wherein:
the computing system implemented financial management system is a computing system implemented personal financial management system.

12. A system for providing a dynamic financial caricature graphic comprising:
a computing system;
a computing system implemented financial management system;
a display device; and
a processor for executing a process for providing a dynamic financial caricature graphic, the process for providing a dynamic financial caricature graphic comprising:
obtaining financial transaction data associated with a user using the computing system implemented financial management system;
categorizing the obtained financial transaction data into a plurality of financial categories;
generating an original dynamic financial caricature graphic of the user, the dynamic financial caricature graphic including two or more different visual characteristics, with each of the at least two characteristics being tied to different respective financial categories, the visual appearance of the two or more visual characteristics being based, at least in part, on the at least part of the financial transaction data associated with the user and visually reflecting a current financial status of the particular financial category associated with the characteristic, wherein the two or more different visual characteristics are chosen from the group consisting of size, weight, height, clothing, and accessories of the original dynamic financial caricature graphic of the user;
displaying the dynamic financial caricature graphic of the user on a computing system display device;
monitoring the financial transaction data associated with the user using a computing system implemented financial management system;
identifying a change in the financial transaction data associated with the user, the identified change being associated with a change in financial status of a financial category associated with a visual characteristic of the dynamic financial caricature graphic;
modifying the dynamic financial caricature graphic of the user, the modified dynamic financial caricature graphic including one or more changed visual characteristics, the one or more changed visual characteristics being based, at least in part, on the changed financial status of the financial category associated with the changed visual characteristic; and
displaying the modified dynamic financial caricature graphic for the user on the display device.

13. The system for providing a dynamic financial caricature graphic of claim 12, wherein:
the dynamic financial caricature graphic of the user is a graphical representation of the user.

14. The system for providing a dynamic financial caricature graphic of claim 12, wherein:
monitoring the financial transaction data associated with the user using a computing system implemented financial management system comprises updating the financial transaction data associated with the user on a periodic basis.

15. The system for providing a dynamic financial caricature graphic of claim 12, wherein:
monitoring the financial transaction data associated with the user using a computing system implemented financial management system comprises identifying when the financial transaction data associated with the user has changed; and
modifying the dynamic financial caricature graphic of the user comprises modifying one or more visual characteristics of the dynamic financial caricature graphic when the financial transaction data associated with the user has changed.

16. The system for providing a dynamic financial caricature graphic of claim 12, wherein:
the computing system implemented financial management system is a computing system implemented personal financial management system.

17. A computer program product for providing a dynamic financial caricature graphic comprising:
a nontransitory computer readable medium;
and computer program code, encoded on the computer readable medium, comprising computer readable instructions executed on a processor for:
obtaining financial transaction data associated with a user using a computing system implemented financial management system;
categorizing the obtained financial transaction data into a plurality of financial categories;
generating an original dynamic financial caricature graphic of the user, the dynamic financial caricature graphic including one two or more different visual characteristics with each of the at least two characteristics being tied to different respective financial categories, the visual appearance of the two or more visual characteristics being based, at least in part, on the at least part of the financial transaction data associated with the user and visually reflecting a current financial status of the particular financial category associated with the characteristic, wherein the two or more different visual characteristics are chosen from the group consisting of size, weight, height, clothing, and accessories of the original dynamic financial caricature graphic of the user;
displaying the dynamic financial caricature graphic of the user on a computing system display device;
monitoring the financial transaction data associated with the user using a computing system implemented financial management system;
identifying a change in the financial transaction data associated with the user, the identified change being associated with a change in financial status of a financial category associated with a visual characteristic of the dynamic financial caricature graphic;
modifying the dynamic financial caricature graphic of the user, the modified dynamic financial caricature graphic including one or more changed visual characteristics, the one or more changed visual characteristics being based, at least in part, on the changed financial status of the financial category associated with the changed visual characteristic; and
displaying the modified dynamic financial caricature graphic for the user on a computing system display device.

18. The computer program product for providing a dynamic financial caricature graphic of claim 17, wherein:
the dynamic financial caricature graphic of the user is a graphical representation of the user.

19. The computer program product for providing a dynamic financial caricature graphic of claim 18, wherein:
the graphical representation of the user includes one or more visual features chosen from the group of visual features consisting of:
a body type of the graphical representation of the user;
clothing worn by the graphical representation of the user;
accessories included with the graphical representation of the user; and
one or more physical features of the graphical representation of the user.

20. The computer program product for providing a dynamic financial caricature graphic of claim 17, wherein;
modifying the dynamic financial caricature graphic of the user comprises modifying one or more visual characteristics of the dynamic financial caricature graphic chosen from the group of visual characteristics consisting of:
a body type of a graphical representation of the user;
clothing worn by the graphical representation of the user;
accessories included with the graphical representation of the user; and
any physical features of the graphical representation of the user.

* * * * *

UNITED STATES PATENT AND TRADEMARK OFFICE
CERTIFICATE OF CORRECTION

PATENT NO.       : 8,243,074 B1
APPLICATION NO.  : 12/270181
DATED            : August 14, 2012
INVENTOR(S)      : Kyle Kilat et al.

It is certified that error appears in the above-identified patent and that said Letters Patent is hereby corrected as shown below:

In the Claims

In Column 29, Line 38, Claim 17, after "including" and before "two", delete "one".

Signed and Sealed this
Third Day of June, 2014

Michelle K. Lee
*Deputy Director of the United States Patent and Trademark Office*